(12) United States Patent
Ooitsu et al.

(10) Patent No.: US 6,808,310 B2
(45) Date of Patent: Oct. 26, 2004

(54) ROLLING BEARING (75) Inventors: Junya Ooitsu, Osaka (JP); Hiroshi Toyota, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 83 days.

(21) Appl. No.: 10/225,288

(22) Filed: Aug. 22, 2002

(65) Prior Publication Data
US 2003/0063825 A1 Apr. 3, 2003

(30) Foreign Application Priority Data
Aug. 23, 2001 (JP) .................................. P2001-252797

(51) Int. Cl.$^7$ .............................................. F16C 33/56
(52) U.S. Cl. .................................. 384/527; 384/492
(58) Field of Search ............................ 384/492, 463, 384/527

(56) References Cited

U.S. PATENT DOCUMENTS

| 3,001,838 A | * | 9/1961 | Lamson et al. ............. 384/463 |
| 5,222,816 A | * | 6/1993 | Kondoh et al. ............. 384/463 |
| 5,271,679 A | * | 12/1993 | Yamazumi et al. ......... 384/527 |
| 5,939,363 A | | 8/1999 | Toyota et al. |
| 5,988,891 A | * | 11/1999 | Yamamoto et al. ......... 384/463 |
| 6,102,576 A | * | 8/2000 | Toyota et al. ............... 384/492 |
| 6,121,208 A | | 9/2000 | Toyota |
| 6,367,981 B1 | * | 4/2002 | Yamamoto et al. ......... 384/527 |

FOREIGN PATENT DOCUMENTS

| JP | 8-226446 | 9/1996 |
| JP | 9-137830 | 5/1997 |
| JP | 2002-39189 | 2/2002 |

* cited by examiner

Primary Examiner—Thomas R. Hannon
(74) Attorney, Agent, or Firm—McGinn & Gibb, PLLC

(57) ABSTRACT

Each of resin cage (4) is injection-molded of a mixture material containing a thermoplastic resin selected as a material excellent in outgassing characteristic, a proper amount of reinforcing fiber, and a proper amount of a lubricating component. A lubricating film (10) made of a fluorine-containing polymer having a functional group is deposited on at least rolling surfaces and/or sliding surfaces of constituent members (inner and outer races 1 and 2), rolling elements (3) and cage 4) of a bearing. That is, the lubricating film (10) makes lubricity good at an early stage of rotation, so that incipient abrasion of the cage (4) can be suppressed. Hence, stabilization of operation with the passage of time can be exhibited on the basis of synergistic action of the lubricating film (10) and micro wear powder generated from the cage (4).

36 Claims, 8 Drawing Sheets

ROLLING BEARING

BACKGROUND OF THE INVENTION

The present invention relates to a rolling bearing having a resin cage. The rolling bearing is used in an environment stringent in lubricating conditions.

Generally, a rolling bearing used in a vacuum chamber of a semiconductor producing apparatus needs to be used without any lubricant. Hence, a cage having lubrication action are used in the rolling bearing. The cage of this type is subjected to micro-wear by coming into slide contact with at least one of inner and outer races and rolling elements. Particles produced by the micro-wear are transferred to a slide partner to thereby lubricate a slide region and ocher contact regions.

The cage of this type not only needs to be excellent in lubricating characteristic to make the life of the bearing long but also needs to be excellent in dusting characteristic and outgassing characteristic. Therefore, at present, the Applicant of the invention has proposed that a cage using polytetrafluoroethylene (PTFE) as a material is used as the cage. Incidentally, the proposed cage is produced by shaving because PTFE cannot be applied to injection molding.

In the related art, productivity is low because the cage has to be produced by shaving, so that it is pointed out that the cost of production is high. On the other hand, there are various thermoplastic resins as resin materials having lubricating characteristic and capable of being subjected to injection molding. It can be however said that any one of the thermoplastic resins is insufficient in durability because both abrasive wear and torque increase at an early stage.

In the related art, the cage needs to be acclimated to a state in which the cage can fulfill its lubrication action. It can be said that the cage is insufficient in lubricating characteristic particularly at an early stage of use.

SUMMARY OF THE INVENTION

In consideration of such circumstances, an object of the invention is to provide a rolling bearing in which improvement in lubricating characteristic and stability in rolling operation can be attained for a long term from an early stage of rotation in spite of use of a resin cage excellent in productivity, low dusting characteristic and outgassing characteristic.

In order to solve the aforesaid object, the invention is characterized by having the following arrangement.

(1) A rolling bearing comprising:
 a resin cage which is injection-molded of a mixture material containing a predetermined amount of reinforcing fiber, a predetermined amount of solid lubricant, and one member selected from the group consisting of ethylene-tetrafluoroethylene, polyether-ether-ketone, polyamide-imide alloy, and thermoplastic polyimide; and
 a fluid-state lubricating film made of a fluorine-containing polymer having a functional group is deposited on at least one of a rolling surface and a sliding surface of constituent members of the bearing.
(2) The rolling bearing according to (1), wherein potassium titanate whisker is selected as the reinforcing fiber.
(3) The rolling bearing according to (1), wherein at least polytetrafluoroethylene is selected as the solid lubricant.
(4) The rolling bearing according to (1), wherein the three members of polytetrafluoroethylene, molybdenum disulfide and graphite are selected as the solid lubricant.
(5) A rolling bearing comprising:
 a resin cage which is injection-molded of a mixture material containing a predetermined amount of reinforcing fiber, a predetermined amount of solid lubricant, and one member selected from the group consisting of ethylene-tetrafluoroethylene, polyether-ether-ketone, polyamide-imide alloy, and thermoplastic polyimide; and
 a solid-state lubricating film made of a fluorine-containing polyurethane high-molecular compound is deposited on at least one of a rolling surface and a sliding surface of constituent members of the bearing.
(6) The rolling bearing according to (5), wherein potassium titanate whisker is selected as the reinforcing fiber.
(7) The rolling bearing according to (5), wherein at least polytetrafluoroethylene is selected as the solid lubricant.
(8) The rolling bearing according to (5), wherein the three members of polytetrafluoroethylene, molybdenum disulfide and graphite are selected as the solid lubricant.
(9) The rolling bearing comprising:
 a resin cage which is injection-molded of a mixture material containing a predetermined amount of reinforcing fiber, a predetermined amount of solid lubricant, and one member selected from the group consisting of ethylene-tetrafluoroethylene, polyether-ether-ketone, polyamide-imide alloy, and thermoplastic polyimide; and
 either a fluid-state lubricating film made of a mixture of a fluorine-containing polymer having a functional group and particles of polytetrafluoroethylene disperses in said fluorine-containing polymer or a solid-state lubricating film made of a mixture of a fluorine-containing polyurethane high-molecular compound and particles of polytetrafluoroethylene dispersed in said fluorine-containing polyurethane high-molecular compound is deposited on at least rolling surfaces and/or sliding surfaces of constituent members of said bearing.
(10) The rolling bearing according to (9), wherein potassium titanate whisker is selected as the reinforcing fiber.
(11) The rolling bearing according to (9), wherein at least polytetrafluoroethylene is selected as the solid lubricant.
(12) The rolling bearing according to (9), wherein the three members of polytetrafluoroethylene, molybdenum disulfide and graphite are selected as the solid lubricant.

DETAILED DESCRIPTION OF PREFERRED EMBODIMENTS

The invention will be described in detail with reference to an embodiment shown in the drawings.

Figure 1:
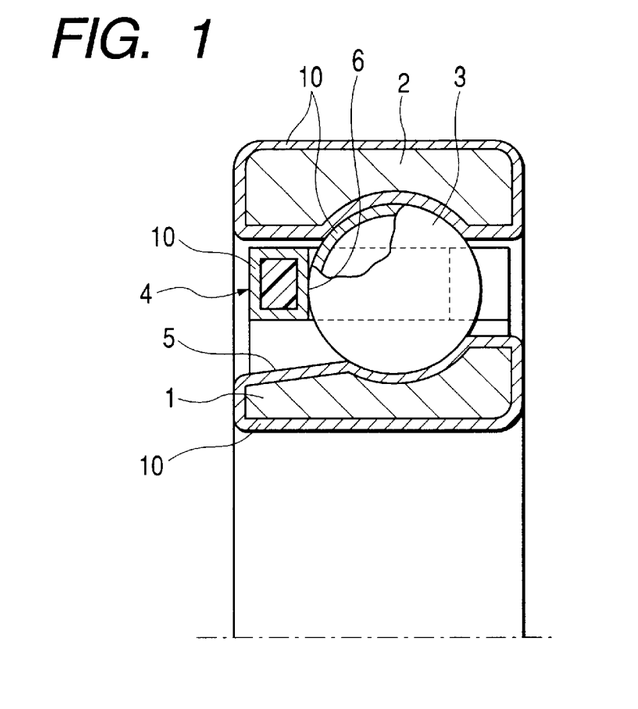
FIG. 1 is a sectional view of an upper half of a rolling bearing according to an embodiment of the invention.
Figure 2:
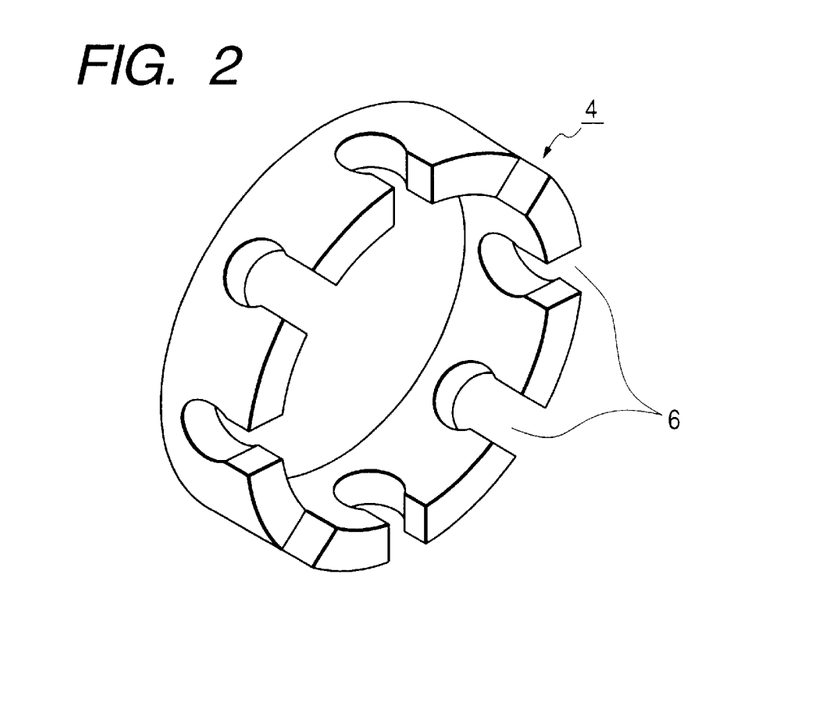
FIG. 2 is a perspective view of one of a cage used in the rolling bearing depicted in FIG. 1.
Figure 3:
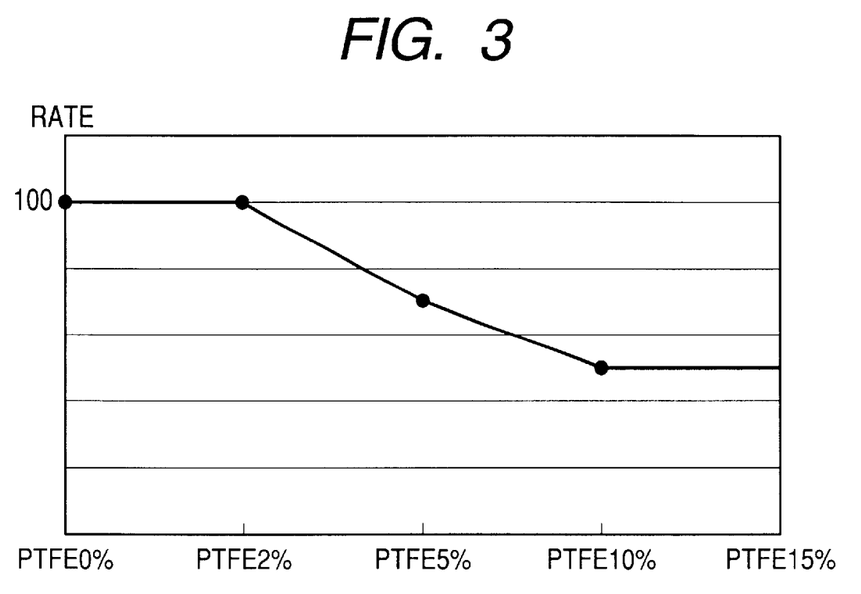
FIG. 3 is a graph showing results of a dusting test in accordance with the amount of PTFE.
Figure 4:
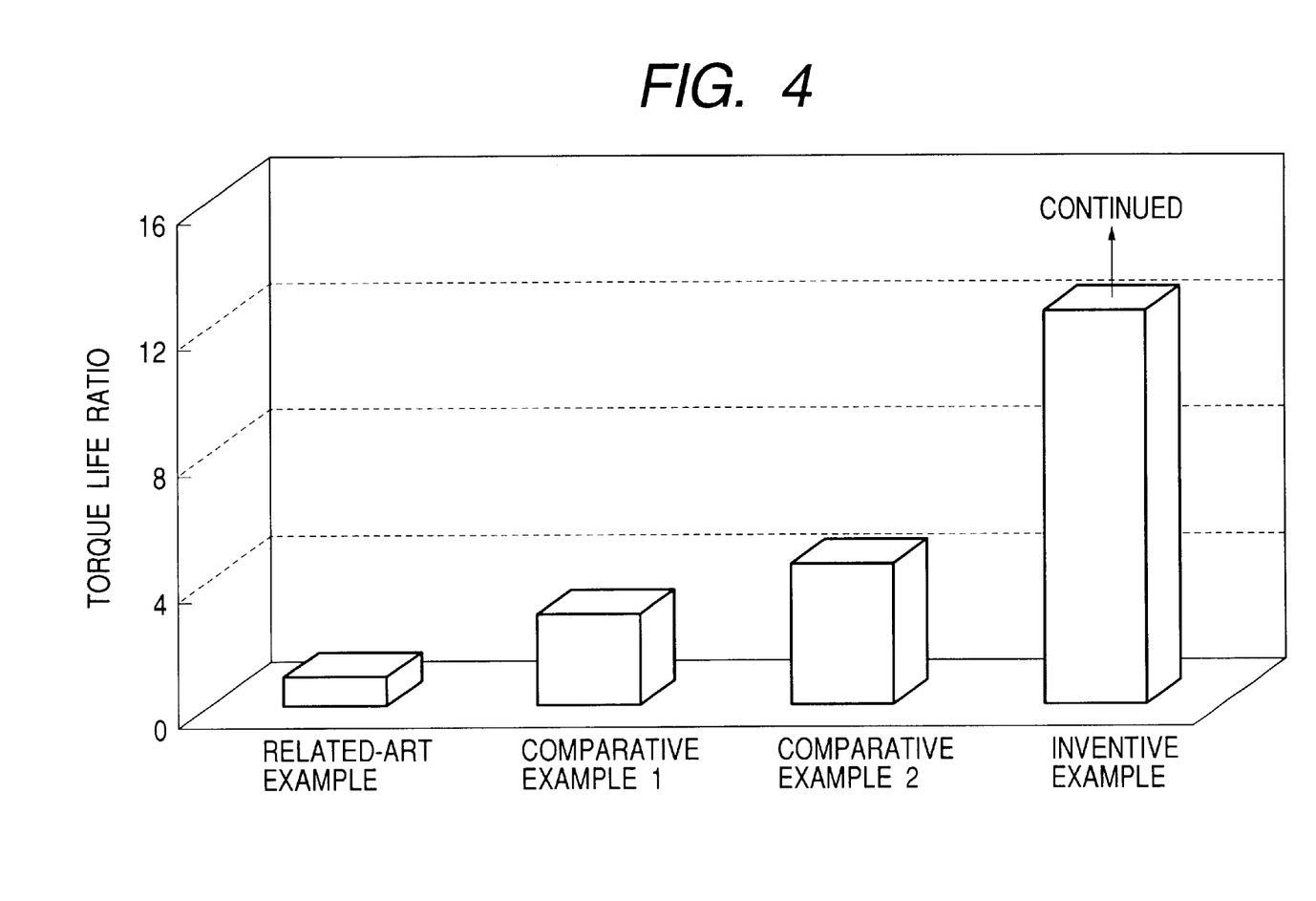
FIG. 4 is a graph showing results of a torque test in a state in which there is no lubricating film deposited.
Figure 5A:
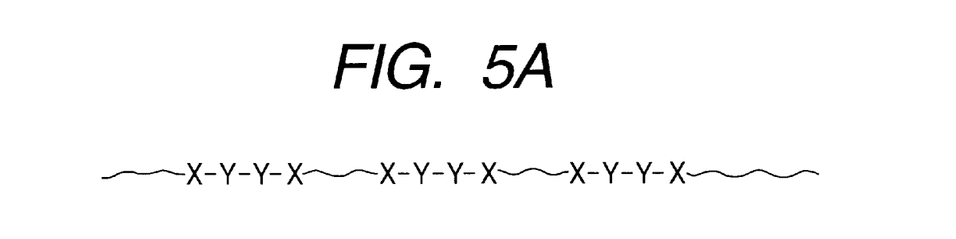
FIGS. 5A and 5B are structural views typically showing the structure of a lubricating film.
Figure 5B:
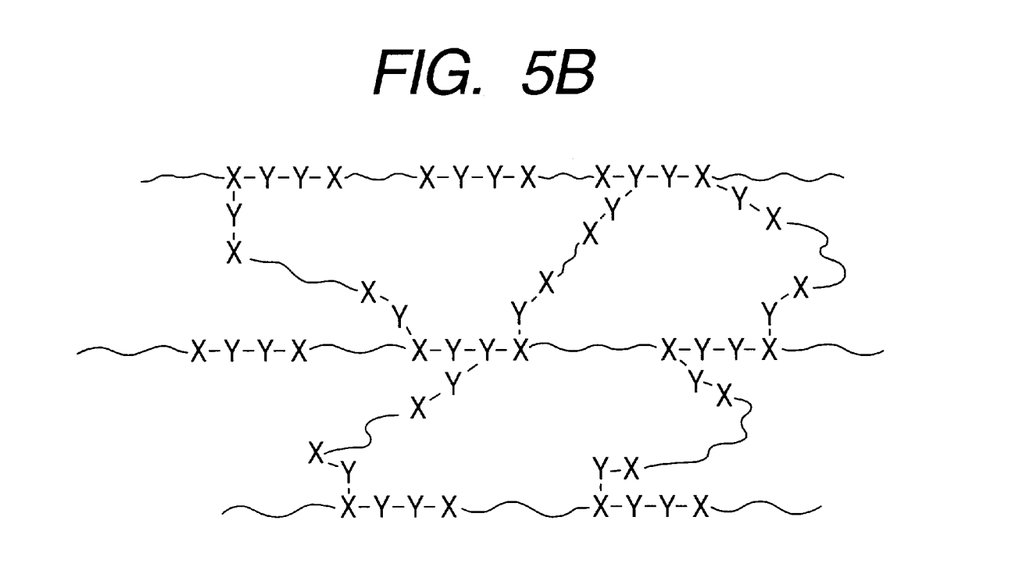
Figure 6:
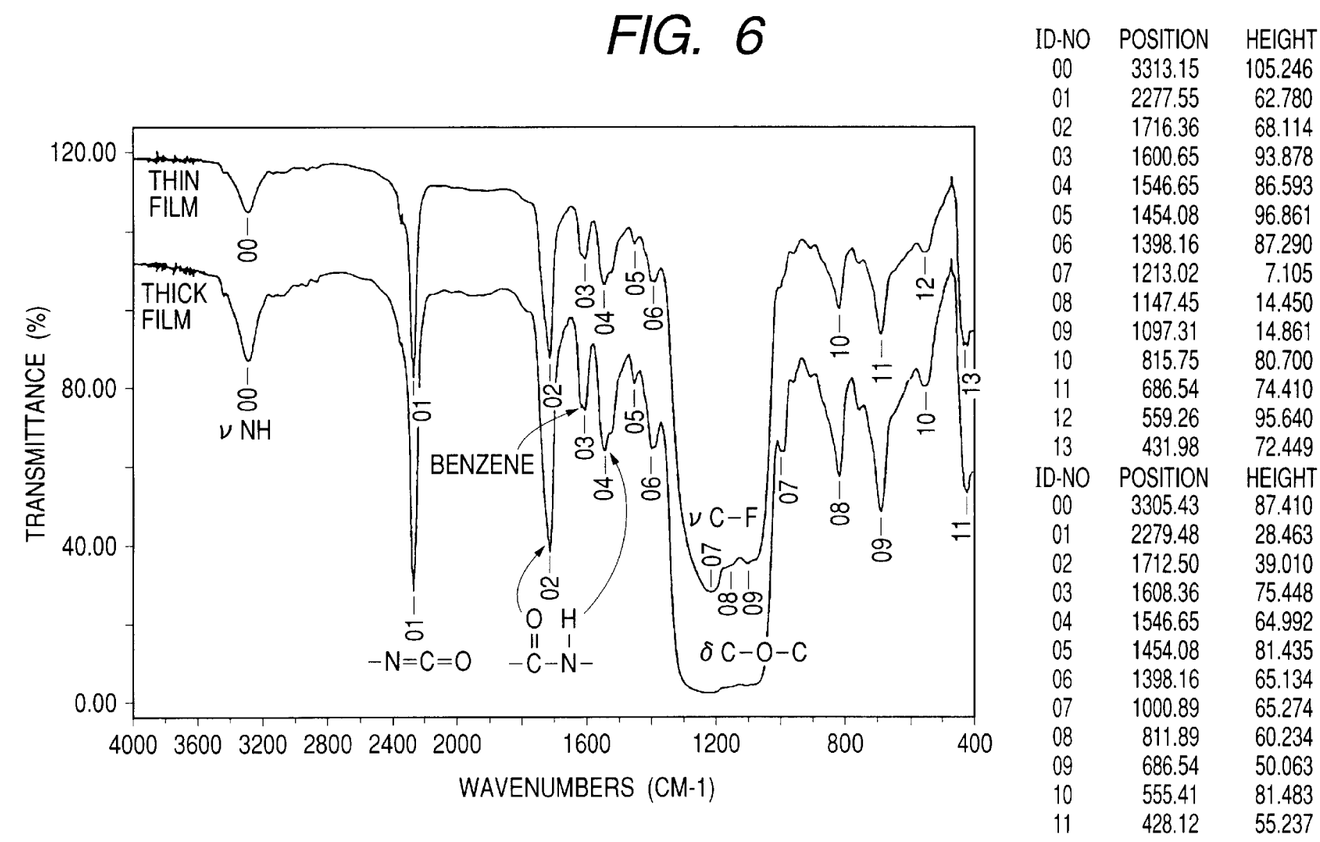
FIG. 6 is a graph showing results of property analysis in a state in which the lubricating film has not been cured yet.
Figure 7:
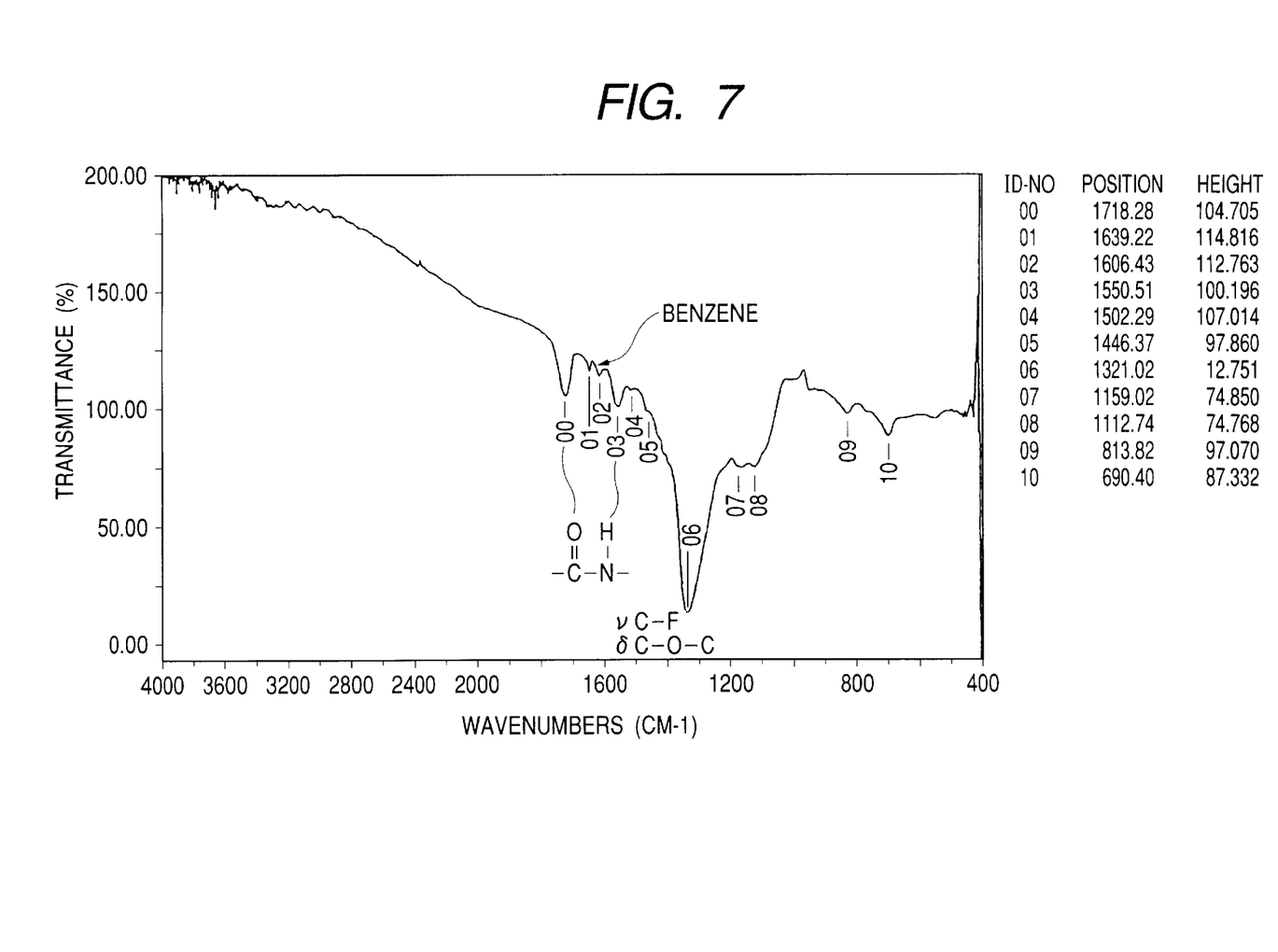
FIG. 7 is a graph showing results of property analysis in a state in which the lubricating film has been already cured.
Figure 8:
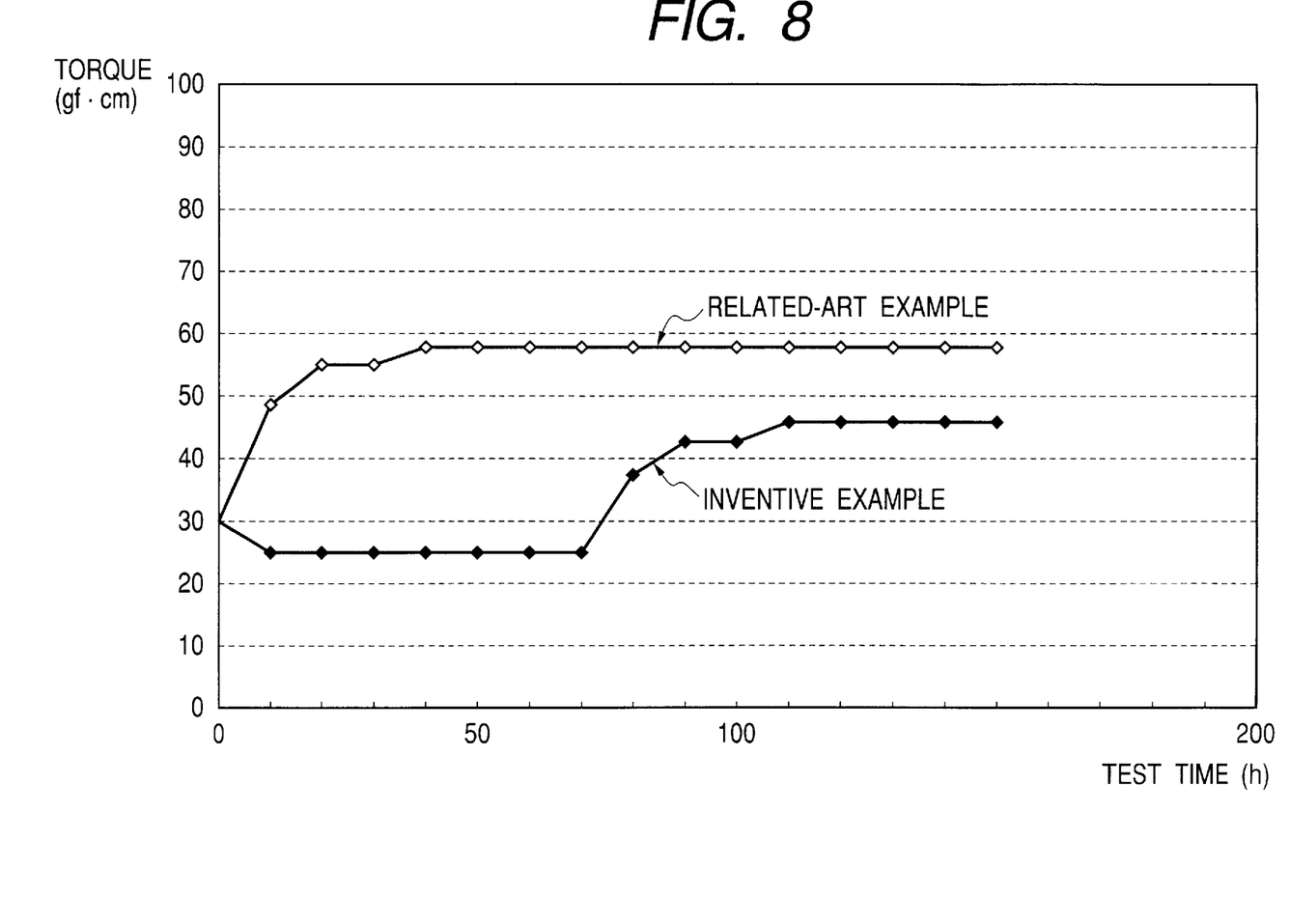
FIG. 8 is a graph showing results of a torque test of the rolling bearing.
Figure 9:
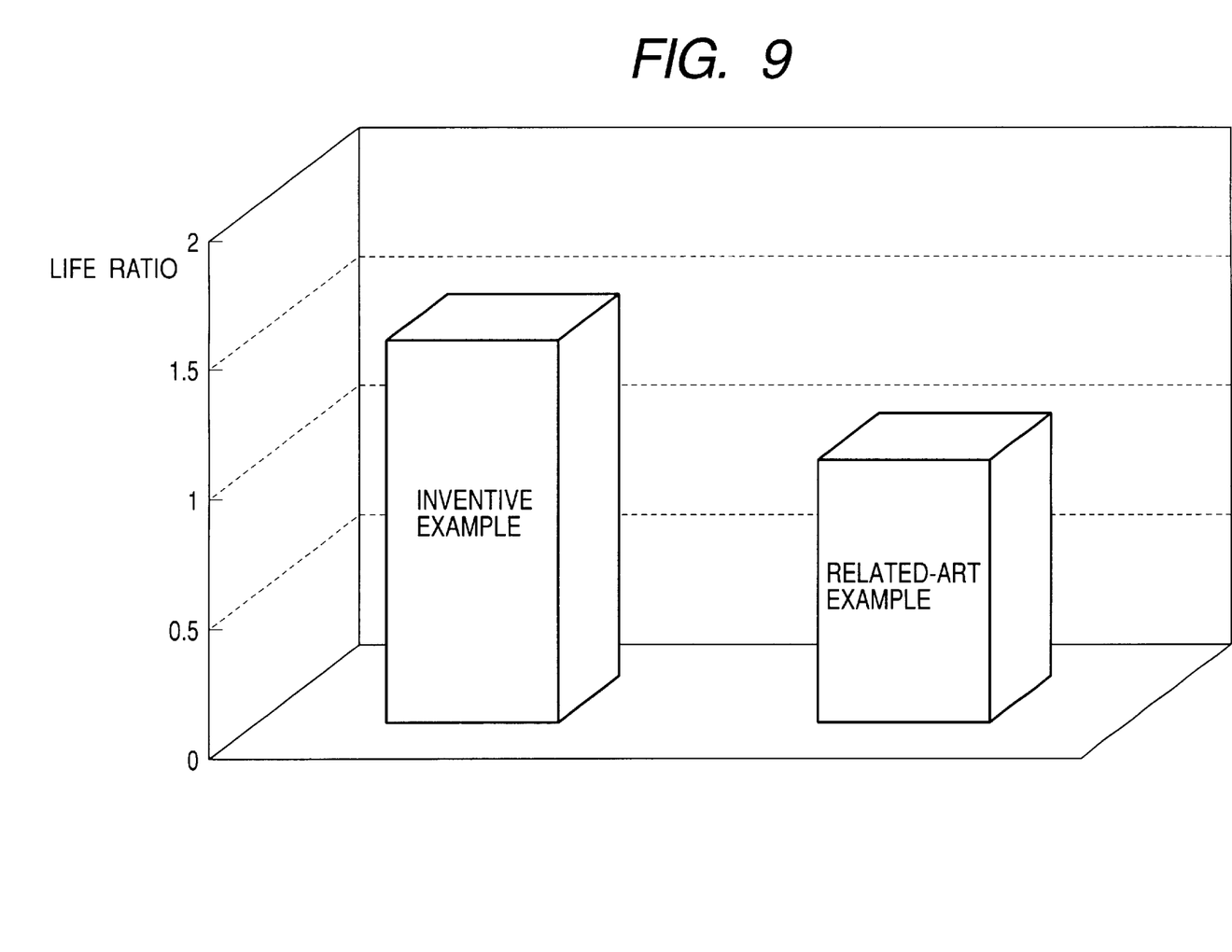
FIG. 9 is a graph showing the life ratio of the rolling bearing.

FIGS. 1 to 9 show an embodiment of the invention. FIG. 1 is a sectional view of an upper half of a rolling bearing. FIG. 2 is a perspective view of a cage. FIG. 3 is a graph showing results of a dusting test in accordance with the amount of PTFE. FIG. 4 is a graph showing results of a torque test in a state in which no lubricating film is deposited. FIGS. 5A and 5B are structural views typically showing the structure of a lubricating film. FIG. 6 is a graph showing results of property analysis in a state in which the lubricating film has not been cured yet. FIG. 7 is a graph showing results of properly analysis in a state in which the lubricating film has been already cured. FIG. 8 is a graph showing results of a torque test in the rolling bearing. FIG. 9 is a graph showing the life ratio of the rolling bearing.

The rolling bearing shown in the drawings is an angular contact ball bearing which has an inner race 1, an outer race 2, a plurality of rolling elements 3 as balls, and a resin cage 4. The rolling bearing is of an outer race guide type in which the cage 4 is guided by an inner circumferential surface of the outer race 2.

A counter bore 5 is provided in a shoulder portion on one side of an outer circumferential surface of the inner race 1. The counter bore 5 is formed to be chamfered like a taper in a state in which a margin for catching the rolling elements 3 is left in a raceway groove of the inner race 1. The outer race 2 has a shape having a raceway groove in the axial center of the inner circumferential surface of the outer race 2.

The cage 4 is so-called snap cage. The cage 4 has pockets 6 provided at places obtained by dividing the circumference of the cage 4 equally. The pockets 6 pass through the circumference radially and are opened on one side axially.

A fluorine-based lubricating film 10 which will be described later is applied to at least one of the inner and outer races 1 and 2 and the rolling elements 3.

First, the cage 4 is produced by injection molding of a mixture material containing a thermoplastic resin as a base material, and reinforcing fiber and a solid lubricant mixed with the thermoplastic resin. The thermoplastic resin, the reinforcing fiber and the solid lubricant are as follows.

Specifically, the thermoplastic resin is one member selected from the group consisting of polyether-ether-ketone (PEEK), polyamide-imide (PAI) alloy, and thermoplastic polyimide (TPI). Incidentally, for example, the trade name AI POLYMER made by MITSUBISHI GAS CHEMICAL COMPANY, INC. can be preferably used as the polyamide-imide (PAI) alloy. For example, the trade name AURUM made by MITSUI CHEMICALS, INC. can be preferably used as the thermoplastic polyimide (TPI).

Short fiber having a diameter of not larger than 2 $\mu$m is preferable used as the reinforcing fiber. Short fiber having a mean fiber diameter of from 0.3 to 0.6 $\mu$m and a mean fiber length of from 10 to 20 $\mu$m is more preferably used as the reinforcing fiber. The amount of the reinforcing fiber is preferably in a range of from 5 to 30% by weight. Particularly potassium titanate whisker can be preferably selected as the reinforcing fiber.

The three members of polytetrafluoroethylene (PTFE), molybdenum disulfide and graphite are preferably selected as the solid lubricant. Preferably, the solid lubricant contains 5 to 30% by weight of polytetrafluoroethylene (PTFE), 3 to 15% by weight of molybdenum disulfide, and 3 to 15% by weight of graphite.

Incidentally, the reason why potassium titanate whisker is selected as the reinforcing fiber is as follows. While potassium titanate whisker has the property of enhancing the total strength of the thermoplastic resin as a base material, the hardness of potassium titanate whisker is relatively low compared with that of any other general reinforcing fiber (such as glass fiber or carbon fiber). Hence, potassium titanate whisker does not injure the partner members (such as the rolling elements 3 and the inner and outer races 1 and 2 in the bearing), so that dust can be prevented from being generated from the partner members.

The reason why the amount of the reinforcing fiber is selected to be in a range of from 5 to 30% by weight is as follows. To begin with, as the amount of the reinforcing fiber increases, the effect of reinforcing mechanical characteristic becomes high but aggression against the partner members becomes intensive. In consideration of the antithetical properties, the lower and upper limits of the amount of the reinforcing fiber are set to be 5% by weight and 30% by weight respectively. Further preferably, the amount of the reinforcing fiber is selected to be in a range of from 10 to 20% by weight.

The reason why polytetrafluoroethylene (PTFE) is selected as one constituent member of the solid lubricant is that PTFE is excellent in the lubrication action based on transference of wear powder. The reason why the amount of PTFE is selected to be in a range of from 5 to 30% by weight is as follows.

First, the upper limit of the amount of PTFE can be determined in consideration of facilitation of kneading with respect to the thermoplastic resin as a base material, that is, in consideration of moldability in injection molding. The determined upper limit is 30% by weight.

On the other hand, the lower limit of the amount of PTFE is determined on the basis of the amount of dust generated in an actual experiment in a state in which cage 4 is incorporated in a rolling bearing. The rolling bearing used in this experiment is JIS (Japanese Industrial Standard) bearing number 608. A laser beam scatter type particle counter is used as a dust measuring apparatus in this experiment. The experimental environment is set to be $10^{-5}$ Pa and 200° C. An axial load of 100 N is imposed on the rolling bearing. The cage 4 disposed in the rolling bearing used in this experiment is produced as follows. Into polyether-ether-ketone (PEEK) as a base material, 10% by weight of potassium titanate whisker as reinforcing fiber and 20% by weight of polytetrafluoroethylene (PTFE) as a solid lubricant are added and kneaded to obtain a mixture material. The mixture material is melted. The molten mixture material is injected in a predetermined mold. In this manner, the cage 4 is produced. The experiment is carried out while the amount of the polytetrafluoroethylene (PTFE) is changed variously.

As a result, as shown in the graph of FIG. 3, the amount of generated dust increases remarkably when the amount of polytetrafluoroethylene (PTFE) is not larger than 2% by weight, whereas the amount of generated dust decreases gradually as the amount of PTFE increases from 2% by weight. When The amount of PTFE is not smaller than 10% by weight, the amount of generated dust is reduced to half the amount of dust generated in the case where the amount of PTFE is not larger than 2% by weight. When the amount of PTFE is set to be 5% by weight, the amount of generated dust takes a middle value between the amount of dust generated in the case where the amount of PTFE is set to be not smaller than 10% by weight and the amount of dust generated in the case where the amount of PTFE is set to be not larger than 2% by weight. Incidentally, the vertical axis "rate" in the graph of FIG. 3 means the change of friction coefficient $\mu$ in accordance with the amount (%) of polytetrafluoroethylene (PTFE). The rate in the case where the amount of PTFE is 0% is regarded as 100. Although it is preferable from the graph that the amount of PTFE is selected to be not smaller than 10% by weight, the lower limit of the amount of PTFE is determined to be 5% by weight in consideration of the possibility that even 5% by weight of PTFE may be sufficiently effective in accordance with the environmental condition used.

The reason why each of the amount of molybdenum disulfide and the amount of graphite is selected to be in a range of from 3 to 15% by weight is as follows. If each of the amounts is smaller than 3% by weight, lubrication action is low. If each of the amounts is larger than 15% by weight, mechanical strength deteriorates. More preferably, each of the amounts is selected to be in a range of from 6 to 15% by weight.

Under this condition, the rolling bearing using the cage 4 is subjected to a torque test. The torque rest is carried out as follows.

The rolling bearing used in the test is a bearing according to JIS bearing number 608. A vacuum high-temperature torque test machine is used as an apparatus for the torque test. The test environment is $10^{-5}$ Pa and 200° C. An axial load of 100 N is imposed on the rolling bearing. The torque life is defined as the operating time required for increasing the measured torque to a value of not smaller than three times as large as the initial torque.

The test is carried out upon Related-Art Example, Comparative Examples 1 and 2 and Inventive Example, that is, four in total.

That is, a cage according to Related-Art Example is produced as follows. For example, into polyether-ether-ketone (PEEK) as a base material, 30% by weight of potassium titanate whisker as reinforcing fiber is added to prepare a mixture material. The mixture material is injected in a predetermined mold to thereby produce a cage.

A cage according to Comparative Example 1 is produced as follows. For example, into polyether-ether-ketone (PEEK) as a base material, 10% by weight of potassium titanate whisker with a diameter of 2 $\mu$m or less as reinforcing fiber and 20% by weight of polytetrafluoroethylene (PTFE) as a solid lubricant are added and kneaded to prepare a mixture material. The mixture material is melted and then the molten mixture material is injected in a predetermined mold to thereby produce a cage.

A cage according to Comparative Example 2 is produced as follows. For example, into polyether-ether-ketone (PEEK) as a base material, 10% by weight of potassium titanate whisker with a diameter of 2 $\mu$m or less as reinforcing fiber, 20% by weight of polytetrafluoroethylene (PTFE) as one member of solid lubricant and 3% by weight of molybdenum disulfide as the other member of solid lubricant are added to prepare a mixture material. The mixture material is injected in a predetermined mold to thereby produce a cage.

A cage according to Inventive Example is produced as follows. For example, into polyether-ether-ketone (PEEK) as a base material, 10% by weight of potassium titanate whisker with a diameter of 2 $\mu$m or less as reinforcing fiber, 15% by weight of polytetrafluoroethylene (PTFE) as one member of solid lubricant, 3% by weight of molybdenum disulfide as another member of solid lubricant and 5% by weight of graphite as the last member of solid lubricant are added to prepare a mixture material. The mixture material is injected in a predetermined mold to thereby produce a cage.

As a result, as shown in FIG. 4, when the torque life in Related-Art Example is regarded as "1", the torque life in Comparative Example 1 is about three times, the torque life in Comparative Example 2 is about four times, and the torque life in Inventive Example is longer than 12 times, That is, torque in Inventive Example is live even after the passage of time corresponding to 12 times.

From the description, even in the case where the two members of polytetrafluoroethylene (PTFE) and molybdenum disulfide are added as solid lubricant as shown in Comparative Example 2, considerable improvement of the life can be observed. It is however proved that remarkable improvement of the life can be observed when the three members of polytetrafluoroethylene (PTFE), molybdenum disulfide and graphite are added as solid lubricant as shown in Inventive Example.

Moreover, a fluorine-based lubricating film 10 is deposited on raceway surfaces of the inner and outer races 1 and 2 and on outer surfaces of the rolling elements 3, which are constituent members of the rolling bearing. The fluorine-based lubricating film 10 will be described below.

First, the inner and outer races 1 and 2 and the rolling elements 3 are formed from corrosion-resistant material. Examples of the corrosion-resistant material include: martensitic stainless steel such as JIS SUS440C; and metal material hardened by properly heating precipitation hardening stainless steel such as JIS SUS630. Austenitic stainless steel such as JIS SUS304 may be also used for the purpose of light load. Further, ceramic material may be used instead of metal material. Examples of the ceramic material include: material containing silicon nitride ($Si_3N_4$) as a main component and sintered by using yttria ($Y_2O_3$) and alumina ($Al_2O_3$) as sintering assistant and by using other suitable components such as aluminum nitride (AlN), titanium oxide ($TiO_2$) and spinel ($MgAl_2O_4$) as occasion demands; alumina ($Al_2O_3$); silicon carbide (SiC) zirconia ($ZrO_2$) ; and aluminum nitride (AlN).

Next, a solid-state film of a fluorine-containing polyurethane high-molecular compound as disclosed in Japanese Patent Laid-Open No. 137830/1997 filed by the Applicant of the invention is used as the lubricating film 10. That is, the lubricating film 10 contains main structural units represented by the general formula —CF—O— (in which X is an integer of 1 to 4). In any case, the average molecular weight of the compound is not smaller than several millions. The lubricating film 10 has a three-dimensional network structure in which molecules are urethane-bonded to one another by a curing reaction. The "three-dimensional network structure" is an expression in terms of chemical structure. That is, this expression does not means that a section of the film forms a network, but means that molecules are continuously connected to one another like a network to thereby form a homogeneous dense structure. A material obtained by changing the chemical structure of a fluorine-containing polymer containing isocyanate functional groups at terminals as represented by the following chemical formula 1 can be used as the fluorine-containing polyurethane high-molecular compound. As the fluorine-containing polymer containing isocyanate functional groups at terminals, there can be preferably used a perfluoro-polyether (PFPE) derivative, specifically, e.g. a FOMBLIN® Z-Derivative (FOMBLIN Z DISOC) made by Montecatini.

Chemical 1

An example of the method for forming the lubricating film 10 will be described below.

(a) A solution for obtaining the lubricating film 10 is prepared. The inner and outer races 1 and 2, the rolling elements 3 and the cage 4 is individually immersed in this solution. Or the rolling bearing completely assembled from these constituent members is immersed in this solution and rotated by several times in this solution. In this manner, a liquid-state film is deposited on outer surfaces of the inner and outer races 1 and 2, the rolling elements 3 and the cage 4 (deposition process). The solution used herein is prepared in such a manner than a fluorine-containing polymer (FOMBLIN® Z-Derivative (FOMBLIN Z DISOC)) containing isocyanate functional groups at terminals is diluted with a diluting solvent (fluorine-based solvent SV90D) to reduce the concentration of the fluorine-containing polymer to 1% by mass.

(b) The whole of the rolling bearing on which the liquid-state film is deposited is heated at a temperature of 40 to 50° C. for about 1 minute to thereby remove the solvent contained in the liquid-state film (drying process). At this point of time, the liquid-state film is still liquid and has fluidity.

(c) Then, for example, the whole of the rolling bearing is heated at a temperature of 100 to 200° C. for a time period of 3to 20 hours (curing process). As a result, the liquid-state film is subjected to curing reaction by the change of the chemical structure of the liquid-state film to thereby obtain a solid-state lubricating film 10 of a fluorine-containing polyurethane high-molecular compound. Incidentally, in the curing process, isocyanate (NCO) at each of terminals in functional group-containing fluorine-containing polymer molecules existing in the liquid-state film is eliminated and then the functional group-containing fluorine-containing polymer molecules are urethane-bonded to one another by four kinds of curing reaction as represented by the following chemical formulae 2 to 5. In this manner, a three-dimensional network structure is formed. The urethane-bonding is performed in such a manner that molecules are cross-linked linearly as typically shown in FIG. 5A by curing reaction as represented by the chemical formulae 2 and 3 and further cross-linked three-dimensionally as typically shown in FIG. 5B by curing reaction as represented by the chemical formulae 4 and 5. Incidentally, FIGS. 5A and 5B typically show chemical structures in such a manner that the chemical formula 1 is simplified as shown in the following chemical formula 6.

Chemical 2

Thus, the lubricating film 10 of a fluorine-containing polyurethane high-molecular compound with a preferred film thickness can be formed in a region in which constituent members of the rolling bearing come into rolling contact or sliding contact with one another. Incidentally, the steps (a) and (h) may be repeated by several times as occasion demands. Finally, the thickness of the lubricating film 10 can be suitably selected to be, for example, in a range of from 0.1 to 3 μm in accordance with the purpose of use.

The properties of the solution prepared in the step (a) are now analyzed in two states, that is, in a state in which the solution has been condensed and dried simply (that is, the resulting solution has fluidity) and in a state in which the solution has been deposited on a sample such as a stainless steel plate and hardened. Results of the analysis are as follows.

The former state is analyzed by an FT-IR method (Fourier transform infrared spectrometry, liquid-state film method). As a result, peaks of NH (3300 cm$^{-1}$), N=C=O (2279 cm$^{-1}$), N(H)C=O (1712 cm$^{-1}$, 1546cm$^{-1}$), benzene (1600 cm$^{-1}$), etc. other than peaks of fluorine-based matter are observed as shown in the graph of FIG. 6. It is confirmed that benzene ring, urethane bond and isocyanate are present as functional groups. Although both a thin film and a thick film are examined individually in this analysis, the film can be analyzed regardless of the film thickness. The latter state is analyzed by an FT-IR method (Fourier transform infrared spectrometry, high-sensitive reflection method). As a result, peaks of benzene ring and urethane bond are observed but peaks of isocyanate are not observed as shown in the graph of FIG. 7. That is, it is confirmed on the basis of these results that the chemical structure of the functional group is changed by the curing reaction represented by the chemical formulae 2 to 5.

The obtained lubricating film 10 forms a three-dimensional network structure in itself, so that the lubricating film 10 is densely applied on a coating target. Moreover, the lubricating film 10 has self-lubricity, so that the lubricating film 10 can suppress dust generated due to abrasion, peeling and dropout accompanying the rolling/sliding operation between constituent members of the bearing. Hence, direct contact between the constituent members of the bearing can be avoided. Moreover, frictional resistance becomes very low, so that the rolling/sliding operation becomes smooth. Moreover, the film hardly deteriorates even in a corrosive environment due to the presence of acid, alkali, water, etc. because the film is different from solid lubricants such as softmetal, carbon, molybdenum disulfide, etc. Hence, exposure of surfaces of the constituent members of the bearing due to peeling and dropout can be suppressed as well as the lubricating effect can be sustained. Hence, corrosion resistance of the constituent members of the bearing can be improved.

The rolling bearing having the above-mentioned characteristics is subjected to a torque life test as follows.

The rolling bearing used in the test is a bearing according to JIS bearing number 608. A vacuum high-temperature torque test machine is used as an apparatus for testing torque. The test environment is a vacuum ($10^{-5}$ Pa) and a temperature of from room temperature to 300° C. The contact surface pressure between the inner and outer races 1 and 2 and the rolling elements 3 in the rolling bearing is set to be 1.6 GPa. The rotational speed is set to be 200 r/m.

The test is carries out upon Prior-Art Example and Inventive Example.

That is, in Related-Art Example, the cage 4 is produced as follows. For example, into polyether-ether-ketone (PEEK) as a base material, 30% by weight of potassium titanate whisker as reinforcing fiber are added to prepare a mixture material. The mixture material is injected in a predetermined mold to thereby produce a cage.

In Inventive Example, the cage 4 is produced as follows. For example, into polyether-ether-ketone (PEEK) as a base material, 10% by weight of potassium titanate whisker having a diameter of 2 $\mu$m or less as reinforcing fiber, 15% by weight of polytetrafluoroethylene (PTFE) as one member of solid lubricant, 3% by weight of molybdenum disulfide as another member of solid lubricant and 5% by weight of graphite as the last member of solid lubricant are added to prepare a mixture material. The mixture material is injected in a predetermined mold to thereby produce a cage. The lubricating film 10 is deposited on the whole of the rolling bearing.

As a result, in the case of Related-Art Example, torque increases to about 50 gf/cm immediately after the passage of 10 hours from a start of rotation and, after that, torque is kept about 58 gf/cm, as shown in FIG. 8. On the other hand, in the case of Inventive Example, torque is kept about 25 gf/cm which is not larger than a half the torque in Related-Art Example, for 70 hours from a start of rotation and, after 70 hours, torque increases gradually to about 45 gf/cm at maximum. That is, torque in Inventive Example can be reduced compared with torque in Related-Art Example. Incidentally, as shown in FIG. 9, the life ratio in Inventive Example is elongated by 1.3 times compared with the life ratio in Related-Art Example when the life ratio in Related-Art Example is regarded as "1". The "life" used herein means a time period required for torque's reaching three times as large as the initial torque.

From the description, it can be said that increase in torque at an early stage of rotation in this embodiment can be reduced greatly compared with the prior art because a rolling contact region or a sliding contact region is lubricated at the early stage by the lubricating film 10. Further, it can be said that both progress in abrasion and increase in torque can be reduced effectively by the synergistic action of lubrication by the lubricating film 10 and lubrication by micro wear powder generated from the cage 4 even after the passage of a predetermined time.

Accordingly, in this embodiment, the cage 4 having self-lubricating characteristic and low dusting characteristic can be produced inexpensively by injection molding. Moreover, because the cage 4 is used in combination with the fluorine-based lubricating film 10, both reduction in torque at an early stage and reduction in torque with the passage of time can be achieved by the synergistic action of the cage 4 and the lubricating film 10 even in a corrosive environment as well as in a clean environment and a vacuum environment. Hence, stable performance can be exhibited for a long term. In addition, because the film as deposited on the whole surface of the bearing, deterioration of the bearing as a whole in a corrosive environment car be suppressed.

The invention is not limited to the embodiment and various applications and modifications may be conceived.

(1) Although the embodiment has shown the case where an angular contact ball bearing is used as the rolling bearing, the form of the bearing is not particularly limited. For example, there may be used a ball bearing such as a deep groove ball bearing, or there may be used a cylindrical roller bearing, a needle roller bearing, a conical roller bearing, a spherical roller bearing, or the like. Various types of cage such as so-called snap cage or machined cage may be used as the cage 4 in accordance with these bearing forms. That is, the invention can be applied to any of these types of cage.

(2) Although the embodiment has shown the case where the film is provided on the whole surface of the bearing, a predetermined effect can be obtained even in the case where the film is provided only on the surfaces of the rolling elements, only on the raceway portions of the races or only on the sliding portion of the cage.

(3) For example, the rolling bearing according to the embodiment may be used in a semiconductor producing apparatus, a vacuum apparatus or a cleaning apparatus (corrosive environment) or may be used in a supercharger of an automobile engine, a gas turbine, or a machine tool.

(4) Torque characteristic in the case where the cage 4 formed by ETFE, PAI or TPI as base material are incorporated in the rolling bearing in a state in which there is no lubricating film 10 deposited is equivalent to that in Comparative Example 1 described above in the torque test of this embodiment. In such a manner, torque characteristic and torque life in the case where the cage 4 described here are incorporated in the rolling bearing in a state in which the lubricating film 10 is deposited can compare favorably with those in this embodiment (5) As the lubricating film 10 described in this embodiment, there can be used a lubricating film described in Japan Patent Laid-Open No. 226446/1996 filed by the Applicant of the invention, in which the former lubricating film is made of a fluorine-containing polymer having a functional group and has fluidity. A lubricating film can be used, which is prepared by dispersing particles of polytetrafluoroethylene (PTFE) into a lubricating film described in Japanese Patent Laid-Open No. 226446/1996 or into a solid-state lubricating film of a fluorine-containing polyurethane high-molecular compound described in the embodiment. In use of any one of these lubricating films 10, the same effect and advantage as in the embodiment can be obtained.

In the rolling bearing according to the invention, cage excellent in self-lubricating characteristic, low dusting characteristic and outgassing characteristic can be produced inexpensively by injection molding. Moreover, the cage is used in combination with a fluorine-based lubricating film so that both reduction in torque at an early stage and reduction in torque with the passage of time can be achieved by the synergistic action of the cage and the lubricating film. Hence, stable performance can be exhibited for a long term. Accordingly, the rolling bearing can be provided as a rolling bearing very effective in the field in which low torque characteristic, low dusting characteristic and a long life are required.

Particularly, when reinforcing fiber and solid lubricant are selected according to the invention, improvement in mechanical strength of the cage, reduction in aggression against a partner and improvement in self abrasion resistance can be preferably attained.

What is claimed is:

1. A rolling bearing comprising:
    a resin cage which is injection-molded of a mixture material comprising:
        a predetermined amount of reinforcing fiber;
        a predetermined amount of solid lubricant; and
        one member selected from the group consisting of polyether-ether-ketone, polyamide-imide alloy, and thermoplastic polyimide; and
    a fluid-state lubricating film comprising a fluorine-containing polymer having a functional group, which is deposited on at least one of a rolling surface and a sliding surface of constituent members of the bearing.

2. The rolling bearing according to claim 1, wherein said reinforcing fiber comprises a potassium titanate whisker.

3. The rolling bearing according to claim 1, wherein said solid lubricant comprises polytetrafluoroethylene.

4. The rolling bearing according to claim 3, wherein said polytetrafluoroethylene comprises 5% to 30% by weight.

5. The rolling bearing according to claim 1, wherein said solid lubricant comprises polytetrafluoroethylene, molybdenum disulfide and graphite.

6. The rolling bearing according to claim 5, wherein said solid lubricant comprises 5% to 30% by weight of said polytetrafluoroethylene, 3% to 15% by weight of said molybdenum disulfide, and 3% to 15% by weight of said graphite.

7. The rolling bearing according to claim 1, wherein said resin cage comprises a snap cage.

8. The rolling bearing according to claim 1, wherein said reinforcing fiber comprises a mean fiber length in a range from 10 μm. to 20 μm.

9. The rolling bearing according to claim 1, wherein an amount of said reinforcing fiber is in a range from 10% to 20% by weight.

10. The rolling bearing according to claim 1, wherein said fluorine-containing polymer comprises a fluorine-containing polyurethane high-molecular compound.

11. The rolling bearing according to claim 1, wherein an amount of said reinforcing fiber is in a range from 5% to 30% by weight.

12. The rolling bearing according to claim 1, wherein said rolling bearing comprises a torque life ratio more than 12.

13. A rolling bearing, comprising:
    a resin cage which is injection-molded of a mixture material comprising:
        a predetermined amount of reinforcing fiber;
        a predetermined amount of solid lubricant; and
        one member selected from the group consisting of polyether-ether-ketone, polyamide-imide alloy, and thermoplastic polyimide; and
    a solid-state lubricating film comprising a fluorine-containing polyurethane high-molecular compound, which is deposited on at least one of a rolling surface and a sliding surface of constituent members of the bearing.

14. The rolling bearing according to claim 13, wherein said reinforcing fiber comprises a potassium titanate whisker.

15. The rolling bearing according to claim 13, wherein said solid lubricant comprises polytetrafluoroethylene.

16. The rolling bearing according to claim 15, wherein said polytetrafluoroethylene comprises 5% to 30% by weight.

17. The rolling bearing according to claim 13, wherein said solid lubricant comprises polytetrafluoroethylene, molybdenum disulfide and graphite.

18. The rolling bearing according to claim 17, wherein said solid lubricant comprises 5% to 30% by weight of said polytetrafluoroethylene, 3% to 15% by weight of said molybdenum disulfide, and 3% to 15% by weight of said graphite.

19. The rolling bearing according to claim 13, wherein said resin cage comprises a snap cage.

20. The rolling bearing according to claim 13, wherein said reinforcing fiber comprises a mean fiber length in a range from 10 μm. to 20 μm.

21. The rolling bearing according to claim 13, wherein an amount of said reinforcing fiber is in a range from 10% to 20% by weight.

22. The rolling bearing according to claim 13, wherein said fluorine-containing polymer comprises a fluorine-containing polyurethane high-molecular compound.

23. The rolling bearing according to claim 13, wherein an amount of said reinforcing fiber is in a range from 5% to 30% by weight.

24. The rolling bearing according to claim 13, wherein said rolling bearing comprises a torque life ratio more than 12.

25. The rolling bearing, comprising:
    a resin cage which is injection-molded of a mixture material comprising:
        a predetermined amount of reinforcing fiber;
        a predetermined amount of solid lubricant; and
        one member selected from the group consisting of polyether-ether-ketone, polyamide-imide alloy, and thermoplastic polyimide; and
    one of a fluid-state lubricating film comprising a mixture of a fluorine-containing polymer having a functional group and particles of polytetrafluoroethylene dispersed in said fluorine-containing polymer and a solid-state lubricating film comprising a mixture of a fluorine-containing polyurethane high-molecular compound and particles of polytetrafluoroethylene dispersed in said fluorine-containing polyurethane high-molecular compound, which is deposited on at least one of rolling surfaces and sliding surfaces of constituent members of said bearing.

26. The rolling bearing according to claim 25, wherein said reinforcing fiber comprising a potassium titanate whisker.

27. The rolling bearing according to claim 25, wherein said solid lubricant comprises polytetrafluoroethylene.

28. The rolling bearing according to claim 27, wherein said polytetrafluoroethylene comprises 5% to 30% by weight.

29. The rolling bearing according to claim 25, wherein said solid lubricant comprises polytetrafluoroethylene, molybdenum disulfide and graphite.

30. The rolling bearing according to claim 29, wherein said solid lubricant comprises 5% to 30% by weight of said polytetrafluoroethylene, 3% to 15% by weight of said molybdenum disulfide, and 3% to 15% by weight of said graphite.

31. The rolling bearing according to claim 25, wherein said resin cage comprises a snap cage.

32. The rolling bearing according to claim 25, wherein said reinforcing fiber comprises a mean fiber length in a range from 10 $\mu$m. to 20 $\mu$m.

33. The rolling bearing according to claim 25, wherein an amount of said reinforcing fiber is in a range from 10% to 20% by weight.

34. The rolling bearing according to claim 25, wherein said fluorine-containing polymer comprises a fluorine-containing polyurethane high-molecular compound.

35. The rolling bearing according to claim 25, wherein an amount of said reinforcing fiber is in a range from 5% to 30% by weight.

36. The rolling bearing according to claim 25, wherein said rolling bearing comprises a torque life ratio more than 12.

* * * * *